May 16, 1933.  B. McCOLLUM  1,909,205

SEISMIC METHOD OF PROFILING GEOLOGIC FORMATIONS

Filed March 5, 1931  2 Sheets-Sheet 1

BURTON McCOLLUM
INVENTOR.

BY Ira J. Adams
ATTORNEYS.

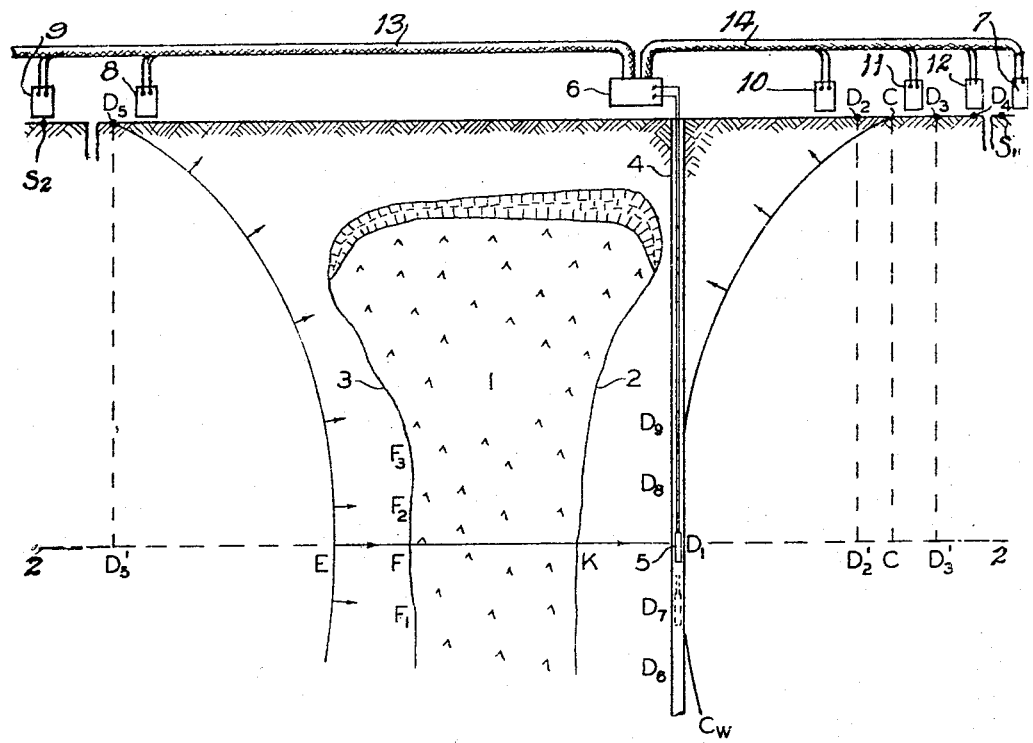

Patented May 16, 1933

1,909,205

UNITED STATES PATENT OFFICE

BURTON McCOLLUM, OF HOUSTON, TEXAS, ASSIGNOR, BY MESNE ASSIGNMENTS, TO THE TEXAS COMPANY, A CORPORATION OF DELAWARE

SEISMIC METHOD OF PROFILING GEOLOGIC FORMATIONS

Application filed March 5, 1931. Serial No. 520,251.

My invention relates to a geophysical method of investigating geologic formations. More specifically, my invention consists in a seismic method of profiling the boundary surfaces of subterranean geologic formations. My method is particularly adapted to determining the position of very steep or substantially vertical boundary surfaces such, for example, as are found on the flanks of salt domes, igneous intrusions, dikes, etc. It will be obvious from the specification that other steep boundary surfaces such as fault planes and the steep surfaces of overturned folds can be accurately determined by the invention described. As will appear from the specification, however, steepness of the boundary surface or contact is not essential to operativeness of the invention. This is merely a feature of the invention in that the difficulty of profiling very steep or vertical surfaces of geologic formations has heretofore been a serious limitation of seismic methods of profiling.

While my method is capable of indicating the presence or absence of geologic formations, such is not the essence of my invention. The essence of my invention consists in a method of profiling with practical accuracy the boundary surface of a formation which, in most instances, is already known to exist. The profiling of these boundary surfaces is a matter of considerable practical and economic importance as will appear from the specification.

Of the drawings which illustrate diagrammatically and by way of example the basic principles and applications of my invention:

Fig. 3 is a modification of the method shown in Fig. 1.

Fig. 4 is a depth-velocity curve.

Figure 1:
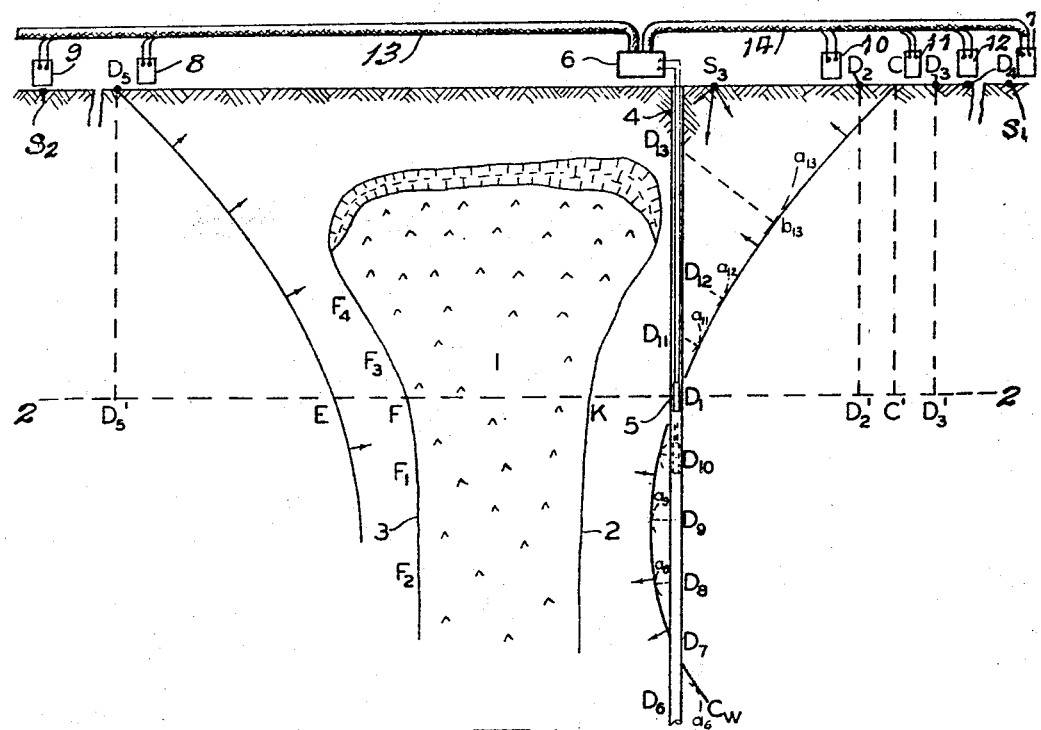
Fig. 1 is a diagram illustrating a practical application of my invention.

By way of illustrating a practical application of my invention I have shown in Fig. 1 a "mushroom" salt dome having flanks 2 and 3 close to which geologic formations containing oil are frequently found. As is well known by petroleum geologists, the oil deposits are almost invariably contiguous the flanks 2 and 3. It is, therefore, a matter of considerable practical and economic importance, in making well locations, to know the position of points at various depths on the flanks of a dome. The determination of the position of such points with respect to points of reference on the surface of the earth, or, in other words, the development of a profile on the flanks of the dome, is the essence of my invention.

The basic principles of my profile method will be understood on reference to Fig. 1 of the drawings together with the following description:

In Fig. 1 a source of sound energy located some distance from the bore hole 4 is denoted by $S_1$. This source may be a buried charge of explosive such as will generate elastic waves in the earth when fired, or it may be other means for generating such waves, as an elevated weight, for example, which will produce seismic waves when dropped on the ground. In general I prefer buried explosives, though other means for producing seismic waves may be used.

At the position $D_1$ in the bore hole 4 is shown means 5 for detecting seismic waves. I call such seismic wave detecting means a detector. The detector is shown connected by means of electrical conductors to a recorder 6 on the surface of the earth, though the detector and recorder may be component parts of a single instrument capable of being lowered into the bore hole as a unit. The detector 5 may be adjusted to various positions in the bore hole, as, for example, $D_6$ to $D_{13}$, by means of a hoisting winch and cable to which the detector is attached. I have used such detectors lowered into bore holes to depths approximating one and a half miles, though my apparatus is capable of being used at greater depths. In addition to detector 5 in bore hole 4, similar detectors are placed near the surface of the earth at points $D_2$, $D_3$ and $D_4$, for example. These detectors are connected to oscillograph units in the recorder 6. In the impulse or signal transmission system, illustrated schematically, detectors 7 and 9 are connected to the charge igniting apparatus (not shown) or in position to be influenced by the detonations so as to transmit currents over lines in cables 14 and 13 respectively to the recorder 6. Similarly detector 8, 10, 11 and 12 are placed so as to be influenced by the resulting seismic waves and transmit currents over lines in cables 13 and 14 to the recorder.

After having lowered the detector 5 into the bore hole 4 to some definite position as, for example $D_1$, a charge of explosive $S_1$, buried at a distant point is fired. The time of firing is transmitted to recorder 6 by wire or radio means well understood in geophysical art. Coincident with the time of firing of the buried explosive a seismic wave will originate at the point of burial and will be transmitted in all directions through the surrounding geologic formations. In accordance with well known laws of transmission of elastic waves through solid media, a vertical section of the wave front is approximately indicated by the curved line $CC_w$. This wave shape is typical of unconsolidated sedimentary formations where the velocity of seismic waves gradually increases with the depth of the formations. There are geographical regions, however, where the wave front will not be a smooth curve as shown, but will be more or less irregular due to strata of geologic formations differing considerably in density and elastic properties.

A method of determining the exact shape of the seismic wave front is one of the features of my invention.

When the seismic wave front originating at $S_1$ reaches the position $D_1$ it will actuate the detector 5 and at its time of arrival at $D_1$ will be recorded by 6. Having recorded the time of origin of the seismic wave at $S_1$ and the time of its arrival at $D_1$, I have, of course, determined the time $TD_1$ required by the seismic wave to travel from $S_1$ to $D_1$. I next move detector 5 to positions $D_6$ to $D_{13}$ and determine by firing additional charges at $S_1$ the times $TD_6$ to $TD_{13}$, respectively, required by the seismic wave to travel from source $S_1$ to points $D_6$, $D_7$, $D_8$, etc. Instead of moving detector 5 to other points as $D_6$ and $D_7$, for example, and firing additional charges at $S_1$, I may place additional detectors at $D_6$ and $D_7$, and, by means of my multi unit recorder, simultaneously determine the times $TD_1$, $TD_6$, $TD_7$, by firing a single charge of explosive at $S_1$.

Having determined the times $TD_1$ to $TD_{13}$, I next determine the times $tD_1$ to $tD_{13}$ required by the seismic wave to travel from source $S_3$ adjacent the bore hole to the points $D_1$ to $D_{13}$, respectively. Then, from the times $tD_1$ to $tD_{13}$, for example, and the known depths of the respective points at which they were obtained, I am able to determine the velocity of a seismic wave in the geologic formations at various depths by means of the following equation:

$$V_{10-9} = \frac{S_3D_9 - S_3D_{10}}{t_9 - t_{10}} \quad (1)$$

In this equation the quantity $V_{10-9}$ is the mean velocity of a seismic wave in the geologic formations at a depth $h$ between the points $D_9$ and $D_{10}$. If $S_3$ is sufficiently near the bore hole 4 to make angle corrections unnecessary the exact depth, $h$, is given by the following equation:

$$h = \frac{S_3D_9 + S_3D_{10}}{2} \quad (2)$$

In a similar manner, I determine the velocity at other depths and then, by platting the velocity $V$ as function of depth $h$, obtain the curve $mn$ shown in Fig. 4. From this curve the approximate velocity $V$ for any depth, from the surface of the earth to the bottom of the bore hole, can be obtained.

I next determine the shape of the seismic wave front passing through $D_1$ as follows:

Points on the wave front as $b_{13}$, for example, are obtained by determining the radius $D_{13}b_{13}$ of the arc $a_{13}b_{13}$ from the equation $$D_{13}b_{13} = (TD_{13} - TD_1)V_{13+} \quad (3)$$

In this equation the factor $V_{13+}$ is the average velocity along the path $D_{13}b_{13}$, and is a function of the mean depth of this path which is arrived at through an estimate based on the known depth $D_{13}$. Having estimated the mean depth of the path $D_{13}b_{13}$, with sufficient accuracy for the results desired, the quantity $V_{13+}$ is obtained from the curve $mn$ in Fig. 4.

Having determined the distance $D_{13}b_{13}$, arc $a_{13}b_{13}$ of radius $D_{13}b_{13}$ is described about the point $D_{13}$. This arc is the locus of a point on the wave front $CC_w$ at the time the wave front is coincident with $D_1$. Then, in like manner, other arcs as $a_6$ to $a_{12}$ are determined. From these arcs and the point $D_1$ the envelope or curve $CC_w$ is established. This curve approximately determines the shape of the wave front passing through $D_1$ with sufficient accuracy for most practical purposes. However, if accuracy approaching the absolute is desired, the mean depth of the path $D_{13}b_{13}$, for example, which was previously estimated, may now be determined graphically by taking the mean of the depths of $D_{13}$ and $b_{13}$. This graphically determined depth will give a more accurate value of $V_{13+}$ on reference to the curve $mn$ and, consequently, a more accurate shape of curve $CC_w$ on second and similar subsequent determinations. However, this additional procedure for accuracy approaching the absolute will seldom be necessary for most practical applications of my invention.

The point C at which the seismic wave front coincident with $D_1$ intersects the surface of the earth is determined as follows:

I fire a charge of explosive at $S_1$, and by means of my multi unit recorder and detectors at $D_1$, $D_2$, $D_3$ and $D_4$, determine the times $TD_1$, $TD_2$, $TD_3$, $TD_4$, respectively, required by the seismic wave to travel from $S_1$ to the points $D_1$, $D_2$, $D_3$ and $D_4$.

Then since C is the point of intersection of the seismic wave front $CC_w$, with the surface of the earth, and since TC is the time required by the seismic wave to travel from $S_1$ to C:

$$TC = TD_1 \qquad (4)$$

The distance $D_1C' = D_1D_3' - C''D'_3 \qquad (5)$

Now if $D_2$, $D_3$ and $D_4$ have been so arranged that the recorded data are such that $$TC > TD_3 \qquad (6)$$

and $TC < TD_2$, for example $\qquad (7)$

Then $C''D_3' = V_1'(TC - TD_3) \qquad (8)$ in which $V_1' = \dfrac{D_2'D_3'}{TD_2 - TD_3} \qquad (9)$ or, substituting for $V_1'$ and TC in Equation (8)

$$C'D_3' = \dfrac{D_2'D_3'}{TD_2 - TD_3}(TD_1 - TD_3) \qquad (10)$$

Then substituting for $C'D_3'$ in Equation (5)

$$D_1C' = D_1D_3' - \dfrac{D_2'D_3'}{T_2 - TD_3}(TD_1 - TD_3) \qquad (11)$$

From Equation (11) I can definitely determine the distance $D_1C'$. Since $TD_1$, $TD_2$ and $TD_3$ have been determined by the recorder and $D_1D_3'$ and $D_2'D_3'$ can be measured with a tape or by other surveying means. At the same time I measure the distance $CS_1$ from the point C, which has been determined by Equation (10), to the position at which $S_1$ was located in determining TC and $TD_6$ to $TD_{13}$, for example.

Since the final result sought in the present exemplary description of my invention consists in developing a profile of the flank 3 of the salt dome 1; I next place a detector at $D_5$ for example, and so locate the source $S_2$ that the distance $$D_5S_2 = CS_1 \qquad (12)$$

Then, when the wave front $D_5E$, originating at $S_2$, reaches the point $D_5$ it will have assumed a shape and configuration substantially equivalent to that of the wave front $CD_1$ when passing through the point C.

Therefore, $D_5'E = D_1C' \qquad (13)$
and $ED_1 = D_5'D_1 - D_5'E \qquad (14)$ in which $D_5'D_1$ is equal to the measured distance between $D_5$ and the top of the bore hole 4.

By means of recorder 6 and detectors at $D_5$ and $D_1$, I determine the times $TD_5$ and $T'D_1$ required by the seismic wave front to travel from source $S_2$ to the points $D_5$ and $D_1$, respectively. Then, since $D_5$ and E are points on the wave front the time TE required for the wave to travel from $S_2$ to E will be such that, $$TE = TD_5 \qquad (15)$$

Therefore, $$T'D_1 - TE = tEF + tFK + tKD_1 \qquad (16)$$

in which $tEF$, $tFK$ and $tFD_1$ are the times required by the seismic wave front to traverse the paths EF, FK and $KD_1$, respectively.

Substituting in Equation (16)

$$T'D_1 - TE = \dfrac{EF}{V_1} + \dfrac{FK}{Vs} + \dfrac{KD_1}{V_1} \qquad (17)$$

in which $V_s$ is the velocity of the seismic wave in the formation traversed by path FK. The velocity of $V_s$ is determined by methods well known in the art of geophysics or taught by my Patents Nos. 1,724,495, 1,724,720 and Re-issue No. 17,242. The quantity $V_1$ is the velocity of the seismic wave in the formations traversed by paths EF and $KD_1$. This quantity for the depth of $D_1$, is determined by reference to the curve $mn$ in Fig. 4.

In Equation (17)

$$EF = ED_1 - KD_1 - FK \qquad (18)$$

Therefore, substituting for EF in Equation (17)

$$T'D_1 - TE = \dfrac{FK}{Vs} + \dfrac{KD_1}{V_1} + \dfrac{ED_1 - KD_1 - FK}{V_1} \qquad (19)$$

Solved for FK, $$FK = \dfrac{Vs\,[ED_1 - V_1(T'D_1 - TE)]}{Vs - V_1} \qquad (20)$$

Thus the thickness FK of dome 1 may be determined by substituting known values in Equation (20) and solving for a definite value of FK. Having determined FK, I next determine the position of F with respect to the known position of $D_1$ by adding the distance $KD_1$ which if not already determined by well logs obtained from wells drilled through the upper portion of the dome and emerging on the flank 2, will be determined by the method taught in my copending application No. 513,559, filed February 5, 1931.

Next, I determine the position of additional points such as $F_1$, $F_2$, and $F_3$ for example; and by so doing, of course, determine the profile of flank 3.

For the purpose of simplicity I have shown the seismic wave path or ray $ED_1$, as a straight line since this will be sufficient for the desired accuracy in most cases. However, I desire to point out that path $ED_1$ will not always be a straight line but will be broken due to refraction at the surfaces 2 and 3. The exact shape of the path will depend, among other factors, on the position of the flanks 2 and 3 and the velocities $V_s$ and $V_1$, for instance. Methods of making second order corrections for these factors are well understood by those versed in the science of physics and may be applied when exceptional accuracy is desired.

In certain instances where exceptional accuracy is desired obvious advantages may accrue to so adjusting the position of $S_1$ and $S_2$ that the wave front $CC_w$ and $D_5E$ will be, substantially vertical along the paths $D_1K$ and $EF$ respectively, in Fig. 3. $S_1$ is adjusted to make the wave front vertical at $D_1$ as follows: Having determined the time $TD_1$ required for the seismic wave to travel from $S_1$ to $D_1$, I next move detector 5 to positions $D_7$ and $D_8$ and determine by firing additional charges at $S_1$ the times $TD_7$ and $TD_8$, respectively, required by the seismic wave to travel from source $S_1$ to $D_7$ and $D_8$. Instead of moving 5 to $D_7$ and $D_8$ and firing additional charges at $S_1$, I may place additional detectors at $D_7$ and $D_8$, and, by means of my multi unit recorder, simultaneously determine the times $TD_1$, $TD_7$ and $TD_8$ by firing a single charge of explosive at $S_1$. Then, if $TD_1$, $TD_7$, and $TD_8$ are substantially equal, I will have established that $S_1$ is at such a distance from bore hole 4 that the wave front is approximately vertical at $D_1$ as desired. If $TD_1$, $TD_7$ and $TD_8$ indicate that the wave front is not approximately vertical at $D_1$, the distance between $S_1$ and bore hole 4 is increased or decreased and additional tests made for the purpose of determining the distance at which the wave front is sufficiently vertical at $D_1$.

Figure 2:
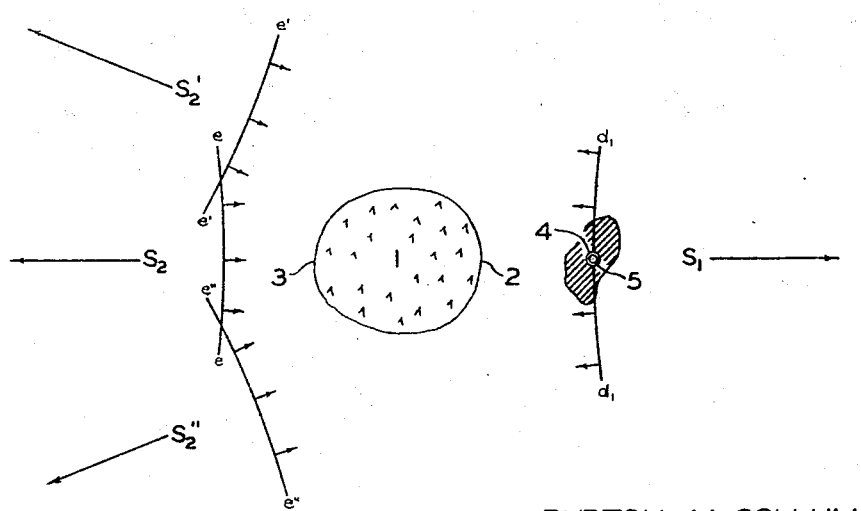
Fig. 2 is a section in a horizontal plane through 2—2 of Fig. 1.

The source of seismic waves $S_2$ need not be diametrically opposite $S_1$, but may be located on the surface to one side or the other of a point diametrically opposite $S_1$ as I have shown in Fig. 2.

While I have mentioned oil bearing formations in connection with the surface profiled, my invention is obviously not restricted to the profiling of surfaces adjacent to oil bearing formations; but may be applied to the profiling of other geologic surfaces, the position of which it is desirable to ascertain.

What I claim is:

1. In the art of determining the shape of seismic wave fronts in a subterranean substance, the method which consists in producing seismic waves in said substance, detecting the arrivals of the waves at points in a substantially vertical line therein, producing seismic waves to pass substantially vertically through said points, detecting the arrivals of the second mentioned waves at said points, and locating points on a wave front at the time it reaches one of said points.

2. In the art of determining the shape of seismic wave fronts in a subterranean substance, the method which consists in producing seismic waves in said substances, detecting the arrivals of the waves at points in a substantially vertical line therein, producing seismic waves to pass substantially vertically through said points, detecting the arrivals of the second mentioned waves at said points, detecting the arrivals of the first mentioned waves at spaced points substantially on the earth's surface and detecting the time of origin of the said seismic waves.

3. In the art of determining the shape of seismic wave fronts in a subterranean substance which consists in producing seismic waves in said substance, detecting the arrivals of the waves at points in a substantially vertical line therein, producing seismic waves to pass substantially vertically through said points, detecting the arrivals of the second mentioned waves at said points, detecting the arrivals of the first mentioned waves at surface points on opposite sides of the surface locus of the wave fronts at the instant such waves pass through a predetermined one of said vertically aligned points and detecting the time of origin of the said seismic waves.

4. In the art of determining the shape of seismic wave fronts in a subterranean substance, the method which consists in producing seismic waves in said substance, detecting the times of arrival of the waves at points in a substantially vertical line therein, producing seismic waves to pass substantially vertically through said points, detecting the times of arrivals of the second mentioned waves at said points, detecting the times of arrivals of the first mentioned waves at surface points on opposite sides of the surface locus of a wave front at the instant such front passes through a predetermined one of said vertically aligned points, producing seismic waves on the other side of said vertically aligned points, detecting the arrival of the last mentioned waves at a surface point spaced from the point of origin of the last mentioned waves an amount equal to the distance between the said surface locus and the point of origin of the first mentioned waves and detecting the time of origin of the said seismic waves.

5. In the art of determining the thickness of subterranean substances, the method which consists in producing a seismic wave on one side of said substance, detecting the arrival of said wave at a point before reaching the surface of the said substance, producing seismic wave on the other side of said substance, and detecting the arrival of said second wave passing through the substance and reaching said point.

6. In the art of determining the cross sectional shape of subterranean substances, the method which consists in producing a seismic wave on one side of said substances, detecting the arrival of said wave at a point adjacent the side of the substance, producing a seismic wave on the other side of said substance, detecting the arrival of the second mentioned wave at the earth's surface after the length of time required for the first mentioned wave to pass to the said point and detecting the time of origin of the said waves.

7. In the art of determining the cross sectional shape of subterranean substances, the method which consists in producing a seismic wave on one side of said substances, detecting the arrival of said wave at a point adjacent the side of the substance, producing a seismic wave on the other side of said substance, detecting the arrival of the second mentioned wave at the earth's surface after the length of time required for the first mentioned wave to pass to the said point, detecting the arrival of the second mentioned wave at said point and detecting the time of origin of the said seismic waves.

8. In the art of determining the shape of seismic wave fronts in a subterranean substance, the method which consists in producing seismic waves in said substances, detecting the arrivals of the waves at points in a substantially vertical line therein, producing seismic waves to pass substantially vertically through said points, detecting the arrivals of the second mentioned waves at said points, detecting the arrivals of the first mentioned waves at spaced points substantially on the earth's surface, and detecting the time of origin of the said seismic waves.

9. In the art of determining the shape of seismic wave fronts in a subterranean substance which consists in producing seismic waves in said substance, detecting the arrivals of the waves at points in a substantially vertical line therein, producing seismic waves to pass substantially vertically through said points, detecting the arrivals of the second mentioned waves at said points, detecting the arrivals of the first mentioned waves at surface points on opposite sides of the surface locus of the wave fronts at the instant such waves pass through a predetermined one of said vertically aligned points, detecting the time of origin of the said seismic waves and locating points on a wave front at the time it reaches said predetermined one of the vertically aligned points.

10. The method of profiling a flank of a subterranean formation which consists in producing seismic waves in the earth's substance at one side of the other flank of said formation, detecting the arrival of the waves at points in a substantially vertical line between the origin of the waves and the other flank of the said formation, producing seismic waves to pass substantially vertically through said points, detecting the times of arrivals of the second mentioned waves at said points, detecting the times of arrivals of the first mentioned waves at surface points on opposite sides of the surface locus of a wave front at the instant such wave passes through a predetermined one of said vertically aligned points, producing seismic waves on the other side of the formation, detecting the arrival of the last mentioned waves at a point spaced from the point of origin of the last mentioned waves an amount equal to the distance between the said surface locus and the point of origin of the first mentioned waves, detecting the time of origin of the said waves and locating points on the wave front at the instant it passes through the second mentioned surface point.

11. The method of profiling a flank of a subterranean formation which consists in producing seismic waves in the earth's substance at one side of the other flank of said formation, detecting the arrival of the waves at points in a substantially vertical line between the origin of the waves and the other flank of the said formation, producing seismic waves to pass substantially vertically through said points, detecting the times of arrivals of the second mentioned waves at said points, detecting the times of arrivals of the first mentioned waves at surface points on opposite sides of the surface locus of a wave front at the instant such wave passes through a predetermined one of said vertically aligned points, producing seismic waves on the other side of the formation, detecting the arrival of the last mentioned waves at a point spaced from the point of origin of the last mentioned waves an amount equal to the distance between the said surface locus and the point of origin of the first mentioned waves, detecting the time of origin of the said waves, locating points on the wave front at the instant it passes through the second mentioned surface point and locating points on the first mentioned flank.

BURTON McCOLLUM.

Certificate of Correction

Patent No. 1,909,205.  May 16, 1933.

BURTON McCOLLUM

It is hereby certified that error appears in the printed specification of the above-numbered patent requiring correction as follows: Page 2, line 5, for "detector" read *detectors*; page 3, line 35, in the denominator of the equation for "$T_2$" read $TD_2$; line 45, for "TC" read $T_C$; line 78, for "tFd$_1$" read $tKD_1$; and line 88, after the word "velocity" strike out the word "of"; and that the said Letters Patent should be read with these corrections therein that the same may conform to the record of the case in the Patent Office.

Signed and sealed this 12th day of September, A. D. 1933.

[SEAL.]

M. J. MOORE,
*Acting Commissioner of Patents.*